United States Patent [19]
Zamitter et al.

[11] Patent Number: 5,037,125
[45] Date of Patent: Aug. 6, 1991

[54] FULLY ARTICULATED SUSPENSION OF TANDEM AXLES OF A VEHICLE

[76] Inventors: Mikhail N. Zamitter, ulitsa Aviakonstruktora Antonova, 2/23, korpus 4, kv. 18, Kiev; Ramil A. Azamatov, Novy gorod, 17/03, kv. 98; Jury A. Grechany, Novy gorod 45/15, kv. 81, both of Naberezhnye Chelny; Vladimir A. Nedorezov, ulitsa Chekhova, 1, kv. 2; Anatoly K. Oblovatsky, ulitsa Mira, 33, kv. 10, both of Dnepropetrovskaya oblast, Sinelnikovo, all of U.S.S.R.

[21] Appl. No.: 457,820
[22] PCT Filed: May 20, 1988
[86] PCT No.: PCT/SU88/00109
§ 371 Date: Jan. 11, 1990
§ 102(e) Date: Jan. 11, 1990
[87] PCT Pub. No.: WO89/11403
PCT Pub. Date: Nov. 30, 1989
[51] Int. Cl.⁵ .................................................. B60G 5/00
[52] U.S. Cl. ....................................... 280/686; 280/718
[58] Field of Search ............. 280/686, 676, 718, 680

[56] References Cited

U.S. PATENT DOCUMENTS 4,886,292 12/1989 Azamatov et al. .................. 280/686

FOREIGN PATENT DOCUMENTS

| 2573362 | 5/1986 | France . | |
|---|---|---|---|
| 8803880 | 6/1988 | PCT Int'l Appl. ................ | 280/718 |
| 751667 | 7/1980 | U.S.S.R. . | |
| 1040244 | 9/1983 | U.S.S.R. . | |
| 2063784 | 6/1981 | United Kingdom . | |

Primary Examiner—Kenneth R. Rice
Attorney, Agent, or Firm—Lilling & Lilling

[57] ABSTRACT

A fully articulated suspension is adapted for linking a frame of a vehicle to axles. To facilitate assembly a C-shaped spring in the form of a plate located in the plane of bending is hinged to axles inside its midmost portion and to the frame through its ends. The C-shaped spring is hinged to the frame through shackles so that a vertical displacement of the spring ends is at its possible maximum whereas a horizontal displacement thereof is not greater than one half of the permissible deformation of the spring in the horizontal direction.

2 Claims, 2 Drawing Sheets

FULLY ARTICULATED SUSPENSION OF TANDEM AXLES OF A VEHICLE

BACKGROUND OF THE INVENTION

1. Field of the Invention

The invention relates to axle suspensions of vehicles and may be used to advantage on trucks with tandem rear axles, either or both of them being of the driving type.

2. Description of Related Art

Zamitter's spring (SU, A,1,040,244) finds an ever-increasing application in suspensions nowadays. It is a C-shaped spring in the form of a plate located in the plane of bending, i.e. one which bends under a load applied in the plane of its maximum stiffness. Zmitter's spring effectively absorbs compression and tensile loads, and combines low specific amount of metal per structure with good resiliency.

A fully articulated axle suspension of a vehicle comprising a C-shaped spring in the form of a plate located in the plane of bending and movably linked to an axle and the vehicle frame has been disclosed in an application filed by R. A. Azmatov et al. The disclosed suspension performs successfully on vehicles with at least two tandem axles. However, the way the suspension is linked to the frame is complex, being accomplished through two bell cranks and a number of hinges. This not only makes the mounting of such suspension a problem but adds to the specific amount of metal per structure of the spring and that of the frame.

SUMMARY OF THE INVENTION

It is an object of the invention to provide a fully articulated suspension of axles of a vehicle which lends itself to fitting on a vehicle frame without difficulty and widens the field of application hereof, due to a change of a point of force application and reaction to the force applied.

This object is materialized by disclosing a fully articulated suspension of tandem axles of a vehicle incorporating a C-shaped spring in the form of a plate located in the plane of bending and movably linked to the axles and frame of the vehicle wherein, according to the invention, the C-shaped spring is hinged to the axles inside its midmost portion and to the frame at the ends, through spring shackles, whereby the axis of each hinge connecting every shackle to the frame is located so that a vertical displacement of the axis of each hinge connecting the spring to the corresponding shackle is at its possible maximum whereas a horizontal displacement is not greater than one half of the permissible deformation of the spring in the horizontal direction.

The fact that the axles are hinged to the C-shaped spring minimizes the number of links between the axles and frame and provides for equalizing a moment of an applied force directly by the moment of spring reaction.

Moreover, since the ends of the C-shaped spring are hinged to the frame through the shackles and are free to move without being hindered by structural members, the spring deflection increases and so does the recoil with the result that the shock-absorbing ability of the suspension increases as well.

BRIEF DESCRIPTION OF THE DRAWINGS

A preferred embodiment of the invention will now be described by way of an example with reference to the accompanying drawings wherein.

DESCRIPTION OF PREFERRED EMBODIMENT

Figure 1:
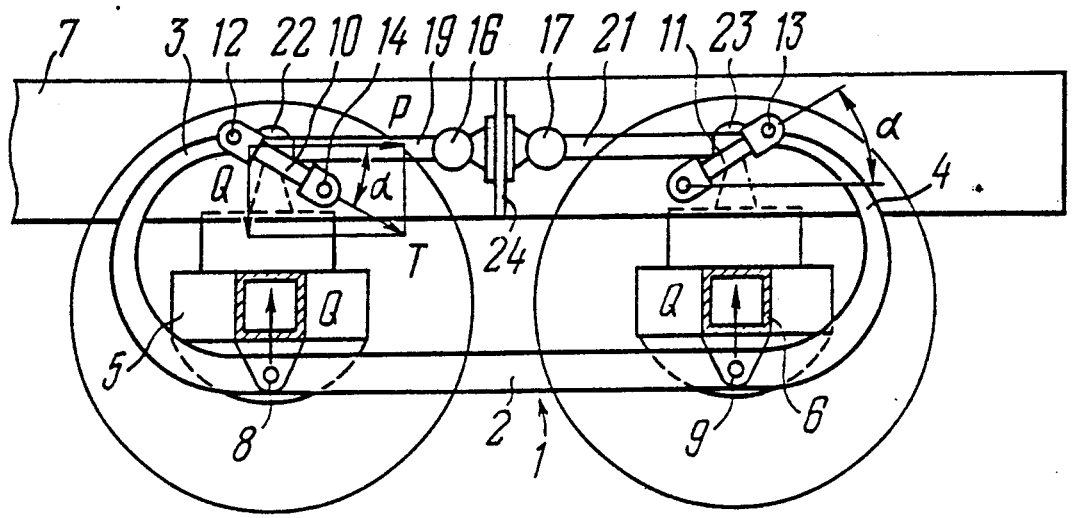
FIG. 1 is a schematic elevation of the suspension according to the invention which links the frame of a vehicle to tandem axles.

Referring to FIG. 1, the fully articulated suspension is designed to link the frame of a vehicle to tandem axles. The suspension incorporates a C-shaped spring 1 in the form of a plate located in the plane of bending. The spring has a midmost portion 2 and two identical end portions 3 and 4 which are referred to as forward and rearward, respectively, with respect to the vehicle. The spring 1 is movably linked to the axles 5, 6 of the vehicle and to the frame 7 or, more specifically, to side members of the frame. In accordance with the invention, the spring 1 is linked to the axles 5, 6 of the vehicle through hinges 8, 9. The spring 1 is also linked with its end portions 3, 4 to the frame 7 through spring shackles 10, 11. More specifically, eyes of the spring 1 can pivot about hinges 12, 13 in the plane of spring deflection. The spring shackles 10, 11, in their turn, are linked to the frame 7 with provision for pivoting about hinges 14, 15 in the same plane. Owing to this arrangement, the spring 1 becomes linked to the frame 7 so that the hinges 12, 13 displace vertically through a maximum possible distance but their horizontal displacement is limited to one half of the permissible deformation of the spring 1 in the horizontal direction. A point to be noted is that silent blocks are used as the hinges to prevent friction between the contacting parts.

Figure 2:
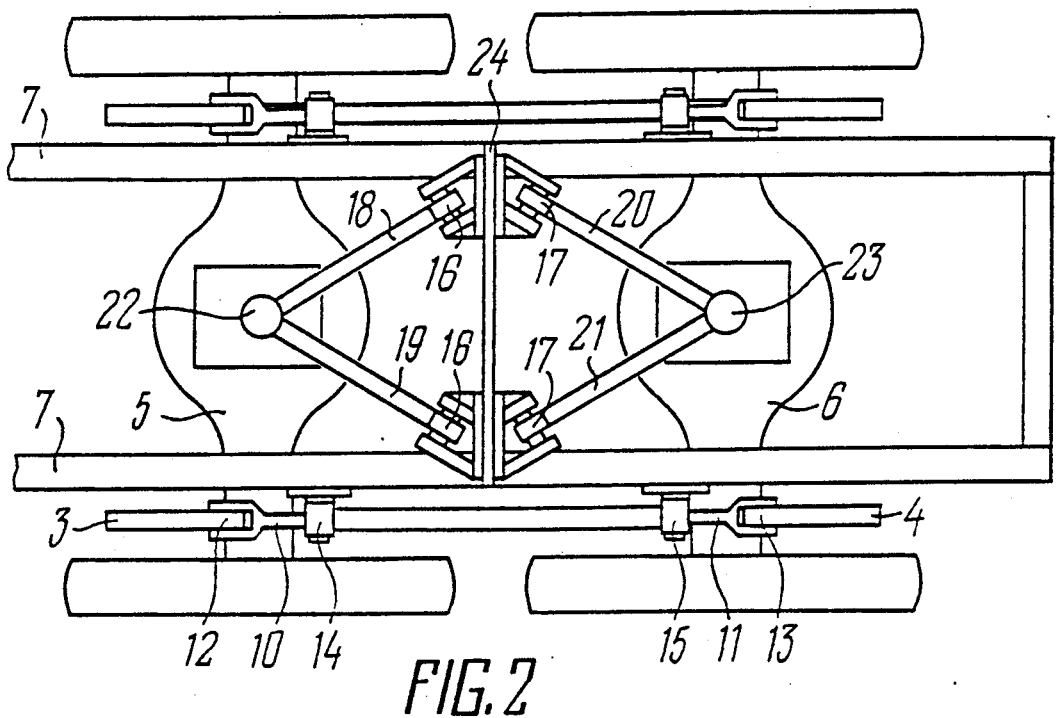
FIG. 2 is a plan view of the suspension shown in FIG. 1.
Figure 3:
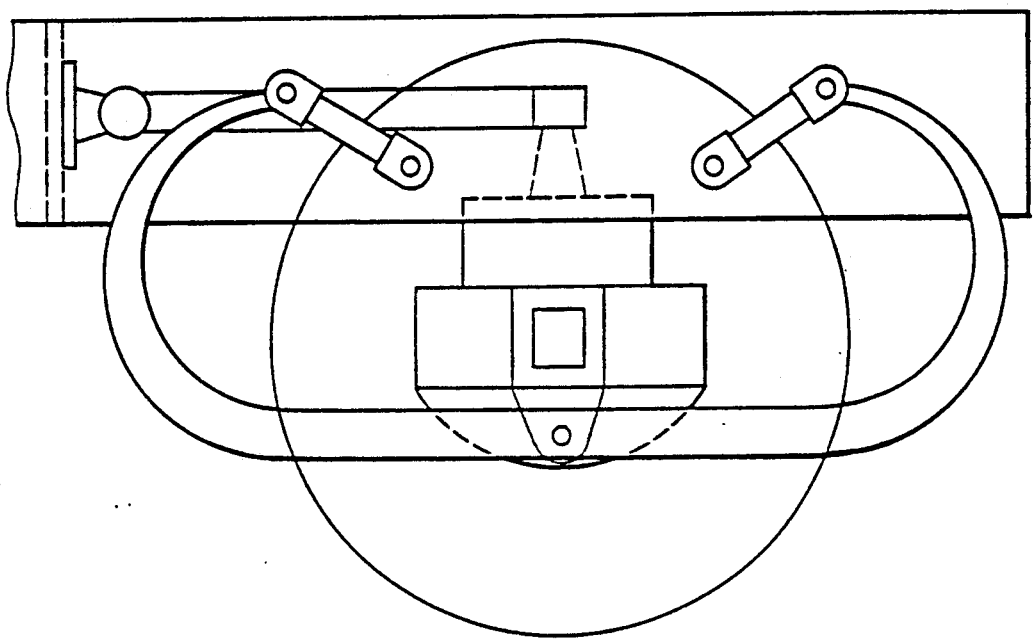
FIG. 3 is a schematic elevation of the suspension according to the invention which links the frame of a vehicle to a single axle.

To avoid sideways displacement, the frame 7 is connected to the axles 5, 6 through spherical hinges 16, 17, torque rods 18, 19, 20, 21 and vertically pivoting hinges 22, 23 (FIGS. 1 and 2). In the preferred embodiment the spherical hinges 16, 17 are fitted to a cross member 24 but it is obvious that they can be attached to the frame 7.

The suspension according to the invention operates as follows.

When the suspension is unloaded because of, for example, the vehicle being lifted by a crane clear of the bearing surface, the frame 7 sustains the pull of gravity of the uncushioned masses $2Q_o$ which is transmitted through the spring shackles 10, 11. A force $T_o = Q_o/\sin \alpha_o$ compresses each spring shackle 10, 11 and a force $P_o = Q_o/\tan \alpha_o$ stretches the spring 1 in this case.

Should it so occur that both wheels get into a longitudinal ditch and the spring 1 recoils, the angle $\alpha_o$ may decrease as compared with its graphical representation in FIG. 1, or even change the sign. An inertial load coming on the uncushioned mass of the suspension is absorbed by the spring 1 and sustained by the frame 7.

Should the axles carry different loads, as may be the case when the vehicle is being lowered by a crane so that only one wheel contacts the bearing surface at first, then the angle of deflection of the spring shackles closest to the axle meeting the obstacle will increase and the suspension will balance itself on the spring shackles until the load on both wheels is equalized.

When a maximum load $2Q_m$ comes on the suspension, the spring shackles 10, 11 deflect through a maximum angle $\alpha_m$. The spring 1 is compressed by two opposing maximum forces $P_m$.

The maximum aggregate deflection of the spring 1 is $\delta_\Sigma = 2\Sigma$, and the maximum displacement of every axle is $f = l(\sin \alpha_m - \sin \alpha_o)$, where l is the length of the spring shackles, 10, 11 (i.e. the distance between the axes of the hinges 12, 14 or 13, 15).

The spring shackles 10, 11 sustain a tensile force $T_m = Q_m/\sin \alpha_m$ in this case. Sideways and, to some extent, longitudinal ones acting on the suspension are carried by the torque rods 18, 19, 20, 21 which also take up reactive and brake torques together with the spring 1. The longitudinal forces set up by the torques are transmitted through the hinges 8, 9 to the midmost portion of the spring 1 which also carries tractive forces.

Improved rideability of the vehicle attributed to the C-shaped spring is not the only advantage of the present invention. It also adds to the resiliency of the suspension.

The suspension according to the invention may find a wide field of application, being suitable for use not only with tandem axles but with single ones as well without any changes of the design.

The disclosed suspension can be easily made and fitted to a vehicle, providing for saving in cost compared with the known suspension.

The invention may be used to advantage on trucks with tandem rear axles, either or both of them being of the driving type.

We claim:

1. A fully articulated suspension of tandem axles of a vehicle having a frame, comprising:
    a C-shaped spring having an inner portion, a midmost portion and two ends, the tandem axles being hinged to the inner portion of the C-shaped spring;
    shackles, each having a first end and a second end, the first end of each shackle being connected through a first hinge to one of the two ends of the C-shaped spring, while the second end of each shackle is connected through a second hinge to the frame, the first end of each shackle being oriented vertically higher than the second end, and being horizontally away from the midmost portion of the C-shaped spring so that a possible vertical displacement of the first end of each shackle is at a maximum while a possible horizontal displacement of the first end of each shackle is not greater than one half of a permissible horizontal deformation of the C-shaped spring.

2. A suspension according to claim 1, further comprising a pair of torque rods for each tandem axle, each torque rod of each pair of torque rods having a first end and a second end, the first end of each torque rod being affixed to the respective tandem axle through a vertical hinge, while the second end of each torque rod is affixed to the frame of the vehicle through a spherical hinge, first ends of each pair of torque rods being mounted together in the vertical hinge, and second ends of each pair of torque rods being equidistantly spaced from a center point of the frame so that the suspension is stabilized.

* * * * *